US007396031B2

(12) United States Patent
Huynh

(10) Patent No.: US 7,396,031 B2
(45) Date of Patent: Jul. 8, 2008

(54) MOBILITY DEVICE

(76) Inventor: Dean Huynh, 3507 Rockrose Dr., Corona, CA (US) 92882

( * ) Notice: Subject to any disclaimer, the term of this patent is extended or adjusted under 35 U.S.C. 154(b) by 152 days.

(21) Appl. No.: 11/468,346

(22) Filed: Aug. 30, 2006

(65) Prior Publication Data

US 2008/0054685 A1 Mar. 6, 2008

(51) Int. Cl.
*B62M 1/14* (2006.01)

(52) U.S. Cl. .................... 280/250.1; 280/246; 280/247; 280/248

(58) Field of Classification Search .............. 280/250.1, 280/657, 658, 87.021, 47.38, 87.01, 47.34, 280/647

See application file for complete search history.

(56) References Cited

U.S. PATENT DOCUMENTS 4,759,562 A 7/1988 Vinyard
4,890,853 A 1/1990 Olson
5,419,571 A 5/1995 Vaughan
5,451,193 A 9/1995 Pickard
5,605,345 A * 2/1997 Erfurth et al. ............ 280/250.1
5,800,317 A 9/1998 Accetta
5,865,455 A * 2/1999 Taylor ..................... 280/250.1
6,158,757 A * 12/2000 Tidcomb ................. 280/250.1
6,371,502 B1 * 4/2002 Howlett et al. ........... 280/304.1
6,378,883 B1 * 4/2002 Epstein .................... 280/250.1
6,494,469 B1 * 12/2002 Hara et al. ............. 280/87.041
6,715,780 B2 * 4/2004 Schaeffer et al. ............ 280/248
6,921,101 B1 7/2005 Lauren
7,066,484 B2 * 6/2006 Willis et al. ................. 280/642
7,219,906 B2 * 5/2007 Hallgrimsson et al. . 280/87.041
7,344,146 B2 * 3/2008 Taylor ........................ 280/246
2002/0079663 A1 * 6/2002 Hallgrimsson et al. . 280/87.041
2004/0245737 A1 * 12/2004 Hallgrimsson et al. ... 280/87.01

* cited by examiner

*Primary Examiner*—J. Allen Shriver
*Assistant Examiner*—Tashiana Adams
(74) *Attorney, Agent, or Firm*—Vladimir Khiterer

(57) ABSTRACT

A mobility device for use by the elderly or disabled persons, that does not require standing, balancing or walking and is propelled by leg paddling of a user, is disclosed. The mobility device comprises a pair of base members, an inverted U-shaped member disposed between the base members, front legs extending downwardly at 45 degrees with respect to the base members with swiveling wheels, a front cross bar disposed between the front legs, such that the front cross bar and the front legs define an opening receiving a user's legs while paddling. Also provided are rear legs with fixed wheels, handles extending outwardly at 70 degrees with respect to the base members, brakes engaging rear wheels, the brakes actuated by levers disposed on the handles, a seat, a back rest and arm rests.

15 Claims, 4 Drawing Sheets

MOBILITY DEVICE

FIELD OF THE INVENTION

The present invention relates to mobility devices for the elderly or disabled persons and, more particularly, to a mobility device that serves as a seated walker propelled by leg paddling of a user.

BACKGROUND OF THE INVENTION

Conventional walkers used by the elderly or disabled persons to assist in the ambulation process comprise a pair of A-shape or inverted U-shape frames joined by cross members that can be gripped by a disabled person and used as support with each step. Some walkers comprise wheels that allow a walker to be rolled forward during ambulation. Some walkers also comprise a seat that allows the user to sit down and rest as needed.

The disadvantage of conventional walkers is that they necessarily rely on the ability of the users to stand, balance and walk. Unfortunately, a significant number of the elderly and disabled persons have difficulty using conventional walkers due to, for example, obesity and severe arthritis, which cause pain with such activities.

Accordingly, what is needed is a mobility device that allows patients to be mobile without the need for standing, balancing or walking.

SUMMARY OF THE INVENTION

The mobility device according to this invention overcomes the disadvantages of the conventional walkers. It comprises a pair of base members, an inverted U-shaped member disposed between the base members, front legs extending downwardly at 45 degrees with respect to the base members with swiveling wheels, a front cross bar disposed between the front legs, such that the front cross bar and the front legs define an opening receiving a user's legs while paddling. Also provided are rear legs with fixed wheels, handles extending outwardly at 45 degrees with respect to the base members, brakes engaging rear wheels, the brakes actuated by levers disposed on the handles, a seat, a back rest and arm rests.

Because the mobility device according to this invention is propelled by leg paddling of the user while the user is seated, there is no need for standing, balancing or walking. Additional advantages of this invention appear to be allowing patients with significant medical conditions who are unable to use conventional walkers to be more active with activities of daily living, minimizing pain and hardship with mobilization, potential for weight loss as a result of increased activity, decrease in risk of falls due to avoiding of standing, balancing or walking.

DETAILED DESCRIPTION

Figure 1:
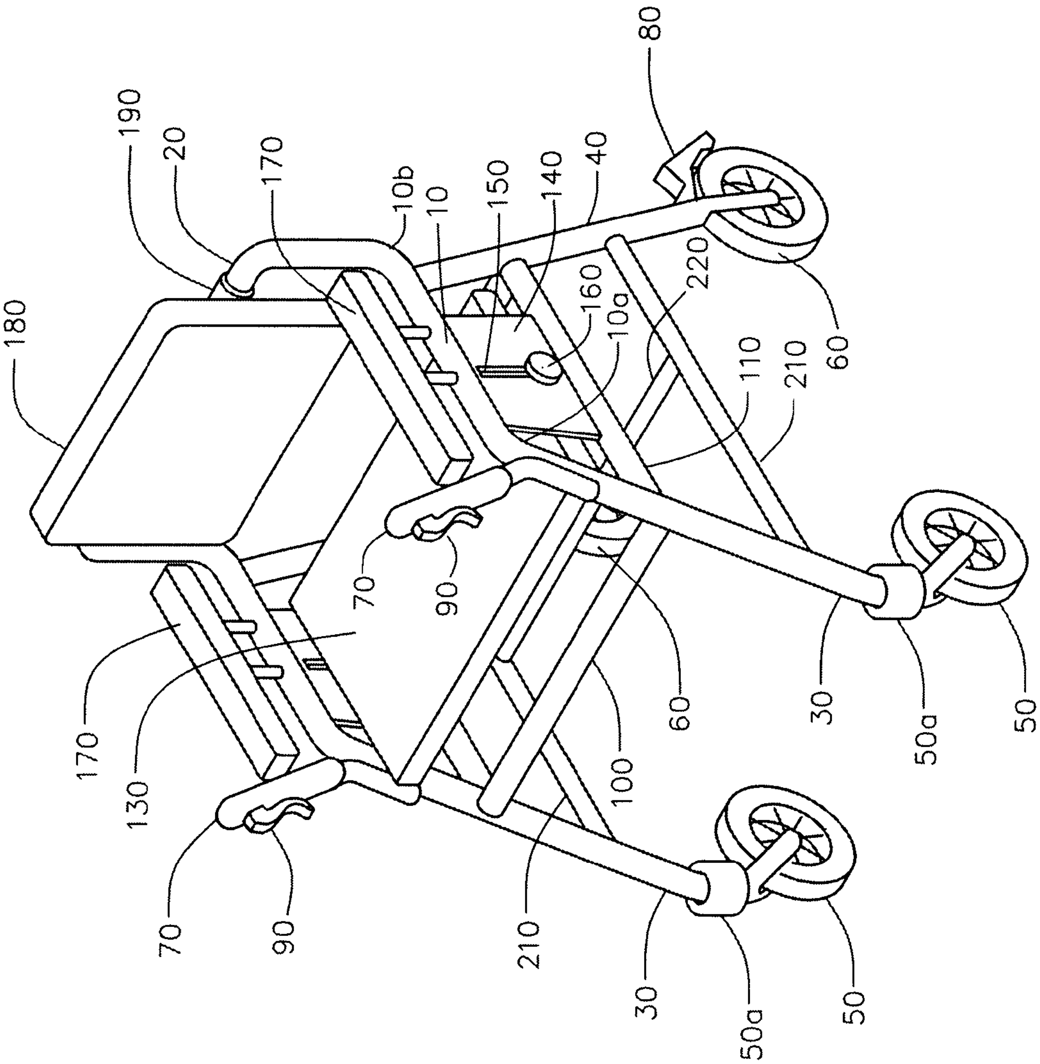
FIG. 1 is a perspective view of the mobility device according to this invention.

This invention will be better understood with the reference to the drawing figures FIG. 1 through FIG. 4. The same numerals refer to the same elements in all drawing figures.

Figure 2:
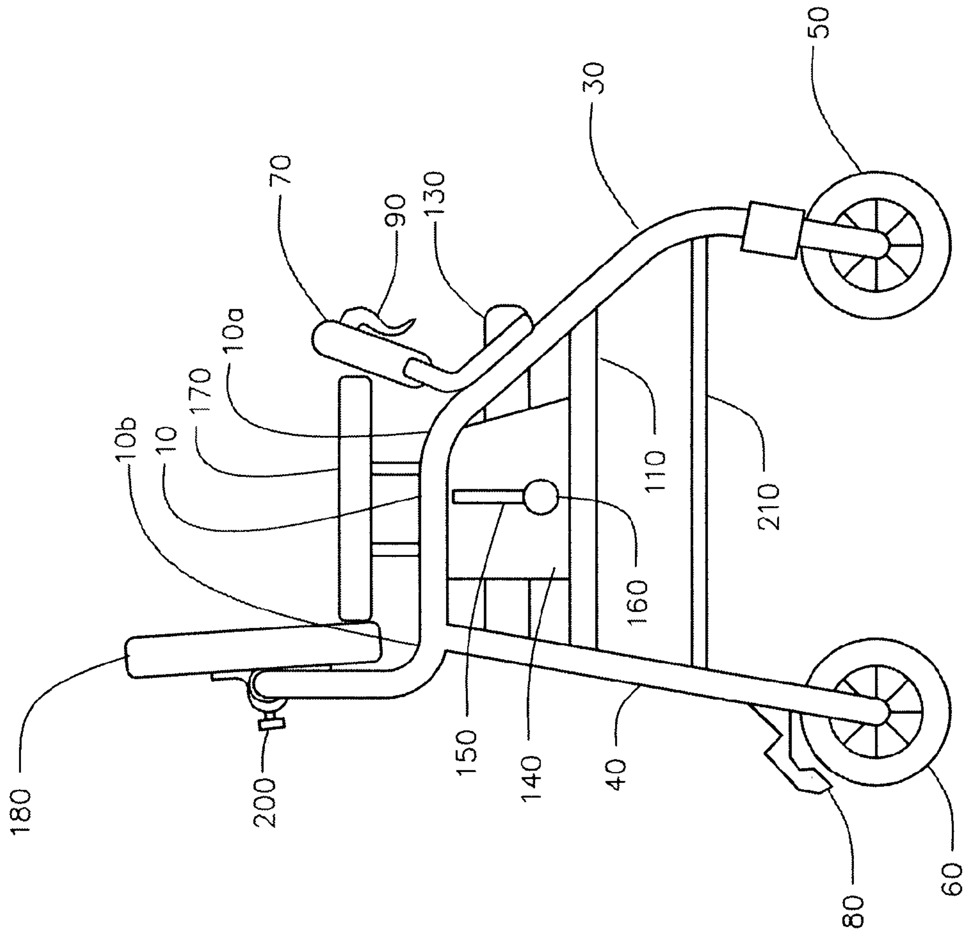
FIG. 2 is a side plan view thereof.
Figure 3:
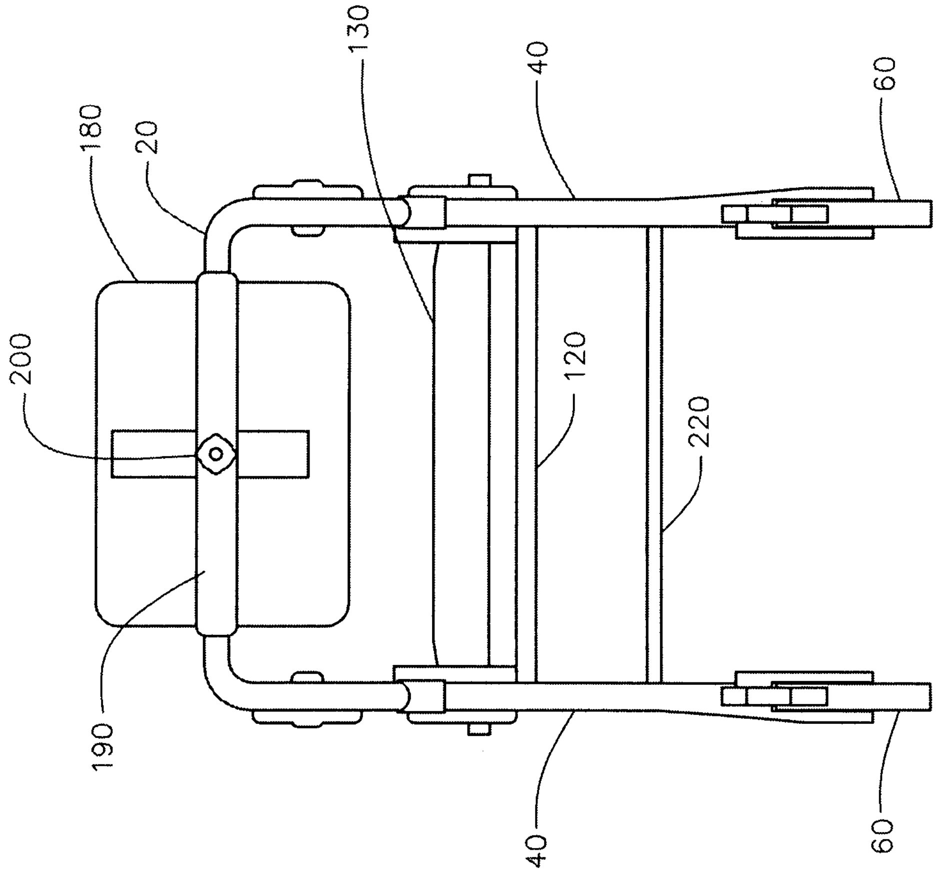
FIG. 3 is a back plan view thereof.

Viewing now, simultaneously, FIGS. 1, 2 and 3, numeral 10 indicates a base member. A pair of base members 10 are substantially horizontally disposed and each comprise a proximate end indicated by numeral 10*a* and a distal end indicated by numeral 10*b*. Numeral 20 indicates an inverted U-shaped member. Inverted U-shaped member 20 is disposed between distal ends 10*b*. Numeral 30 indicates a front leg. A pair of front legs 30 is shown in FIGS. 1 and 2 to be extending downwardly from proximate ends 10*a* at a 45 degree angle with respect to base members 10, which is the most advantageous angle between front leg 30 and base member 10 (as will be clear to the persons knowledgeable in the pertinent art from the description below). This angle between front leg 30 and base member 10 may be ranging from about 30 degrees to about 50 degrees. In the preferred embodiment shown in FIGS. 1-3, front legs 30, base members 10 and U-shaped member 20 comprise a unitary piece of a tubular aluminum, which is the most advantageous from the point of view of structural rigidity and cost of manufacture.

Numeral 40 indicates a rear leg. A pair of rear legs 40 extends downwardly from distal ends 10*b*.

Numeral 50 indicates a front wheel. A pair of front wheels 50 are attached, by way of a swivel bearing assembly indicated by numeral 50*a*, to bottoms of front legs 30. Numeral 60 indicates a rear wheel. A pair of rear wheels 60 are fixedly attached to bottoms of rear legs 40. It is most advantageous for front wheels 50 and rear wheels 60 to have a diameter ranging from about 4 inches to about 8 inches in order to better negotiate obstacles for the user while ambulating.

Numeral 70 indicates a handle. A pair of handles 70 is shown in FIGS. 1 and 2 to be extending outwardly from proximate ends 10*a* at a 70 degree angle with respect to base members 10. This is the most advantageous angle for the user to have a firm and comfortable grip of handles 70 because it provides for a natural contour of a hand grip. This angle, however, may be ranging from about 45 degrees to about 90 degrees.

Numeral 80 indicates a brake. Brakes 80 engage rear wheels 60 so that the user can safely mount and dismount the mobility device of this invention. Brakes 80 are actuated by levers indicated by numeral 90. Levers 90 are disposed on handles 70, such that brakes 80 can be selectively placed in a locked position and an unlocked position. In a locked position, it is safe for the user to mount and dismount the mobility device of this invention. As will be apparent to the persons knowledgeable in the pertinent arts, a conventional means of transferring the movement of levers 90 into locking and unlocking brakes 80 is a cable running from lever 90 to brake 80.

Numeral 100 indicates a front cross bar. Front cross bar 100 is substantially horizontally disposed between front legs 30, such that front cross bar 100 and front legs 30 define an opening receiving the user's legs while paddling. This is why the 45 degree angle between front leg 30 and base member 10 is the most advantageous in providing room for the user's leg paddling action. Front cross bar 100 also serves to provide structural rigidity of the mobility device of this invention.

Numeral 110 indicates a side cross bar. A pair of side cross bars 110 are substantially horizontally disposed between front legs 30 and rear legs 40. Like front cross bar 100, side cross bars 110 serve to provide structural rigidity of the mobility device of this invention.

Numeral 120 indicates a rear cross bar. Rear cross bar 120 is substantially horizontally disposed between rear legs 40.

Numeral 130 indicates a seat. Seat 130 is substantially horizontally disposed above front cross bar 100 and side cross bars 110. In the preferred embodiment shown in FIG. 1-3, seat 130 is resting on an adjustable height seat assembly comprising a pair of opposite side plates indicated by numeral 140. Each side plate 140 is disposed between base member 10 and side cross bar 110. Numeral 150 indicates a slot. Slots 150 are substantially vertically disposed in a side plates 140.

Numeral 160 indicates a threaded locking clamp. A pair of threaded locking clamps 160 are slidably disposed within slots 150 supporting seat 130. This allows the user to secure seat 130 in a variety of vertical positions within slots 150.

Numeral 170 indicates an arm rest. A pair of arm rests 170 are disposed above base members 10. In the preferred embodiment shown in FIG. 1-3, arm rests 170 comprise adjustable height arm rest assemblies in a manner allowing the user to secure arm rests 170 in a variety of vertical positions with respect to base members 10.

Numeral 180 indicates a back rest. Back rest 180 is disposed on U-shaped member 20. In the preferred embodiment shown in FIG. 1-3, back rest 180 comprises a swivel assembly indicated by numeral 190 affixed to back rest 180 and a locking means indicated by numeral 200 disposed on swivel assembly 190. Swivel assembly 190 is disposed on U-shaped member in a manner allowing the user to swivel back rest 180 about U-shaped member 20 and to secure back rest 180 at a variety of angles with respect to seat 130 by way of locking means 200.

Numeral 210 indicates a bottom support member, which is included in the preferred embodiment shown in FIG. 1-4. A pair of opposite bottom support members 210 are substantially horizontally disposed between the bottoms of front legs 30 and rear legs 40. Bottom support members 210 serve to provide structural rigidity of the mobility device of this invention.

Numeral 220 indicates a middle bar, which is included in the preferred embodiment shown in FIG. 1-3. Middle bar 220 disposed between substantially middle portions of bottom support members 210 in order to provide additional structural rigidity of the mobility device of this invention.

Figure 4:
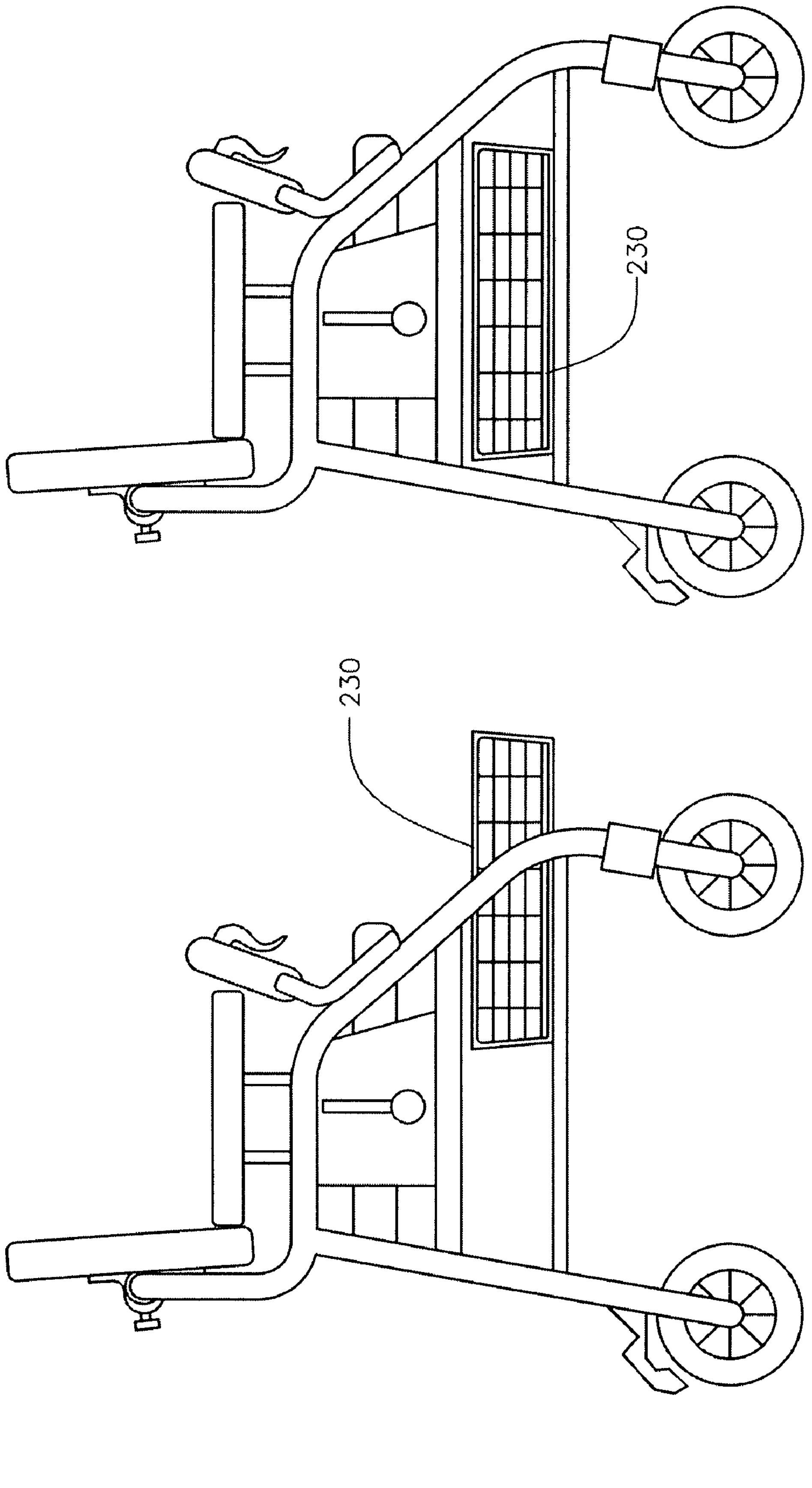
FIG. 4 is a perspective view thereof showing an additional feature according to the preferred embodiment of this invention.

Viewing now FIG. 4, numeral 230 indicates a shelf. Shelf 230 is slidably disposed above bottom support members 210 and serves for storage of the user's items.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A mobility device comprising:

(1) a pair of substantially horizontally disposed base members, each comprising a proximate end and a distal end;

(2) an inverted U-shaped member disposed between the distal ends;

(3) a pair of front legs extending downwardly from the proximate ends at a first angle ranging from about 30 degrees to about 50 degrees with respect to the base members;

(4) a pair of rear legs extending downwardly from the distal ends;

(5) a pair of front wheels attached, by way of a swivel bearing assembly, to bottoms of the front legs;

(6) a pair of rear wheels fixedly attached to bottoms of the rear legs;

(7) a pair of handles extending outwardly from the proximate ends at a second angle ranging from about 45 degrees to about 90 degrees with respect to the base members;

(8) brakes engaging rear wheels, the brakes actuated by levers disposed on the handles, such that the brakes can be selectively placed in a locked position and an unlocked position;

(9) a front cross bar substantially horizontally disposed between the front legs, such that the front cross bar and the front legs define an opening receiving a user's legs while paddling;

(10) a pair of side cross bars substantially horizontally disposed between the front and rear legs;

(11) a seat substantially horizontally disposed above the front and side cross bars.

2. A mobility device as in claim 1 further comprising a pair of arm rests disposed above the base members.

3. A mobility device as in claim 2 further comprising a back rest disposed on the U-shaped member.

4. A mobility device as in claim 3 wherein the front and rear wheels have a diameter ranging from about 4 inches to about 8 inches.

5. A mobility device as in claim 4 wherein the first angle is about 45 degrees.

6. A mobility device as in claim 5 wherein second angle is about 70 degrees.

7. A mobility device as in claim 6 wherein the front legs, base members and U-shaped member comprise a unitary piece of a tubular metal.

8. A mobility device as in claim 7 wherein the tubular metal is aluminum.

9. A mobility device as in claim 8 further comprising a pair of opposite bottom support members, each substantially horizontally disposed between the bottoms of the front and rear legs.

10. A mobility device as in claim 9 further comprising a middle bar disposed between substantially middle portions of the bottom support members.

11. A mobility device as in claim 10, further comprising an adjustable height seat assembly.

12. A mobility device as in claim 11, wherein the adjustable height seat assembly comprises:

a pair of opposite side plates, each side plate disposed between the base member and the side cross bar, the side plates comprising a substantially vertically disposed slots;

a pair of threaded locking clamps supporting the seat, the locking clamps slidably disposed within the slots in a manner allowing the user to secure the seat in a variety of vertical positions within the slots.

13. A mobility device as in claim 12, wherein the arm rests further comprising adjustable height arm rest assemblies in a manner allowing the user to secure the arm rests in a variety of vertical positions with respect to the base members.

14. A mobility device as in claim 13, wherein the back rest further comprises a swivel assembly and a locking means in a manner allowing the user to swivel the back rest about the U-shaped member and to secure the back rest at a variety of angles with respect to the seat.

15. A mobility device as in claim 14, further comprising a shelf slidably disposed above the bottom support members.

* * * * *